(No Model.)

G. HOFFMAN.
AUTOMATIC DEVICE FOR REMOVING WATER FROM CELLARS.

No. 424,553. Patented Apr. 1, 1890.

Witnesses.

George Hoffman, Inventor.
By James Sangster, Attorney.

UNITED STATES PATENT OFFICE.

GEORGE HOFFMAN, OF BUFFALO, NEW YORK.

AUTOMATIC DEVICE FOR REMOVING WATER FROM CELLARS.

SPECIFICATION forming part of Letters Patent No. 424,553, dated April 1, 1890.

Application filed February 12, 1890. Serial No. 340,160. (No model.)

*To all whom it may concern:*

Be it known that I, GEORGE HOFFMAN, a citizen of the United States, residing in Buffalo, in the county of Erie and State of New York, have invented certain new and useful Improvements in Automatic Devices for Removing Water from Cellars, of which the following is a specification.

The object of my invention is to produce an automatic device for taking the water out of a cellar or other place, and thereby keeping it dry at all times; and it consists in certain improvements in a siphon-injector, which is adapted to do its work with but little attention after being properly put in place in a cellar in connection with a city water-works or other source of water-supply having sufficient pressure, all of which will be fully and clearly hereinafter described and claimed, reference being had to the accompanying drawings, in which—

Figure 1:
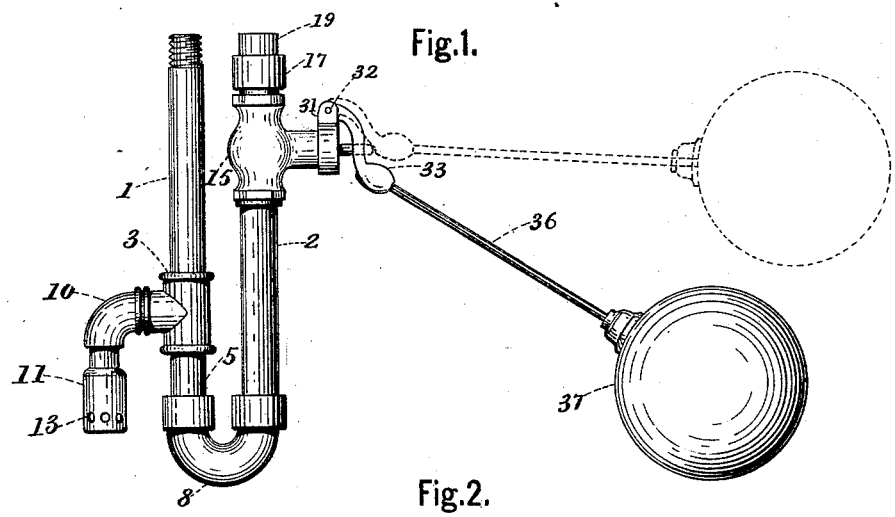
Figure 2:
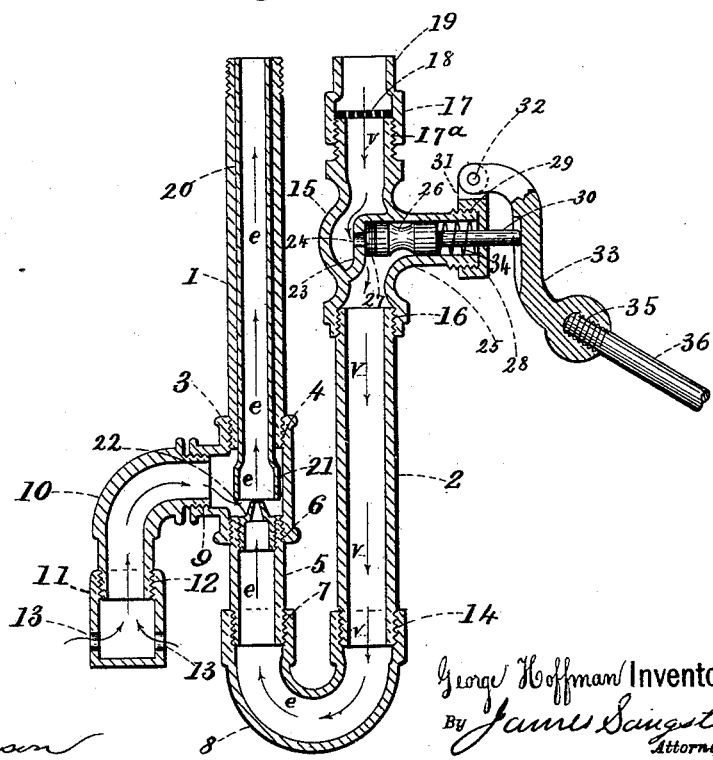

Figure 1 is a side elevation of the device complete. Fig. 2 is a vertical longitudinal central section cutting through the greater portion of the device.

This device is composed, preferably, of ordinary gas-pipe, and consists of the two vertical portions 1 and 2, the vertical portion 1 consisting of the T-shaped union 3, into which the upper pipe 1 is secured by the screw portion 4. Below the T portion 3 is secured a short pipe 5 by the screw portion 6, having secured to its lower end by a screw portion 7 a return-bend 8. At the front of the T 3 is secured by the screw portion 9 a downwardly-curved inlet-nozzle 10, having at its lower end a perforated end piece 11, secured by the screw portion 12. In this end piece is a series of perforations 13, the bottom or under side being closed. At the other side of the return-bend 8 is secured by a screw portion 14 the vertical pipe 2, to the top of which is secured the valve-case 15 by the screw portion 16, and on the top of the valve-case is a short tube 17, secured thereto by a screw portion 17ª, within which is a perforated strainer 18. The reduced portion 19 is adapted to be connected in any well-known way with a pipe connecting with the water-works or other source of water-supply having sufficient pressure, and constitutes the inlet side of the device for that purpose. The opposite side of the device 1 is adapted to be connected with an outlet-pipe in any well-known way for carrying off the water.

Within the pipe 1 is secured by any well-known cement—sulphur, for instance—a glass tube 20, having its lower end 21 enlarged in diameter. (See Fig. 2.) This lower end passes down within the T portion 3, as shown. Below the enlarged portion 21 of the glass tube 20 is a contracted nozzle 22, secured by a screw portion within the upper part of the pipe 5. The glass tube 20 prevents the accumulation of scale or dirt of any kind from gathering and adhering to the inner sides of the same, thereby keeping everything free and clear, which is an important matter in this kind of device.

The valve-case 15 is provided with a dividing-partition 23 on the inside, having an opening 24 through it, and also an outward projecting cylindrical portion 25, in which the valve 26 operates, so as to open or close the opening 24. The end of the valve that rests against the valve-seat is provided with an elastic disk 27, either leather or rubber, for keeping the joint tight. To the outer end of the portion 25 is a cap 28, secured thereto by a screw portion 29. Through this cap 28 the valve-stem 30 passes. Between the cap 28 and the piston-valve 26 is a spiral spring 34, the object of which is to assist in keeping the valve up to its seat. At the top of the cap 28 are two ears 31, to or between which is pivoted by a pin 32 a short arm 33, to which is attached a removable arm 36, having a light metallic float 37 secured to its opposite end. The object of the strainer 18 at the upper part of the valve-case is to prevent obstructions of any kind getting into the valve and interfering with its action.

The operation of the invention is as follows: The device is set in place in a pit or recess so that the inlet-nozzle 11 will be below the level of the floor it is designed to keep dry. As the water rises in the pit, float 37 rises with it, and when sufficiently high to move the arm 33 and release the end of the valve-stem 30 the water-pressure above will overcome the force of the spring 34 and open the valve, so that the water will pass down in the direction of the arrows *v* through the valve and down through the pipe 2, then up through the return-bend 8, and into and through the pipes 5 and 1 in the direction of the arrows $e$, and as it passes through the contracted nozzle 22 it produces a vacuum and draws a large portion of the water in the pit up with it, which passes through the openings 13 in the direction of the arrows $f$, up through the nozzle 10, and then into the pipe 1 and out. When sufficient water is taken out of the pit in which the device is placed to lower the float again, the valve 26 is closed and the device remains quiet until the water rises again, when the same action is repeated.

I claim as my invention—

In a siphon-injector, the combination of the two tubular portions 1 and 2, connected by a return-bend at the bottom, the portion 1 having a nozzle projecting outward and downward and having a series of perforations at the bottom, a glass tube 20 within the pipe 1 and below it a contracted nozzle 22, a valve-case mounted on the portion 2, having a partition provided with an opening 24, communicating between the upper and lower portions of the same, a projecting portion from the valve-case containing a valve seated over the opening 24, an arm pivoted to the cap 28, resting against the valve-stem, and a float secured to the arm for operating the valve, substantially as described.

GEORGE HOFFMAN.

Witnesses:
JAMES SANGSTER,
HENRY ASHBERY.